United States Patent [19]

Snow

[11] 4,130,961
[45] Dec. 26, 1978

[54] FOLDING GRAPPLE FOR TRAPS

[76] Inventor: Herman I. Snow, 111 Davis Ave. North, Litchfield, Minn. 55355

[21] Appl. No.: 767,943

[22] Filed: Feb. 11, 1977

[51] Int. Cl.$^2$ .............................................. A01M 23/00
[52] U.S. Cl. ...................................... 43/96; 114/305; 294/66 R
[58] Field of Search ......................... 43/96; 294/66 R; 114/305

[56] References Cited

U.S. PATENT DOCUMENTS

| 203,087 | 4/1878 | Swinburne | 114/305 |
| 1,258,023 | 3/1918 | Landfried | 43/96 |
| 2,602,689 | 7/1952 | Matz | 294/66 R |

FOREIGN PATENT DOCUMENTS

| 113627 | 8/1941 | Australia | 294/66 R |
| 275397 | 6/1965 | Australia | 114/305 |
| 13703 of | 1902 | United Kingdom | 114/305 |

*Primary Examiner*—Nicholas P. Godici
*Assistant Examiner*—Roscoe V. Parker
*Attorney, Agent, or Firm*—Littlepage, Quaintance, Murphy, Richardson and Webner

[57] ABSTRACT

A folding grapple for traps as used for trapping upland animals and the like consists of a primary grapple member formed of an elongated rod provided with an eye at one end thereof and two oppositely disposed hooks at the other end. The said eye is at substantially right angles to the axis of the rod with the hole formed by the eye having a central axis parallel to the rod axis. A cam loop member is integrally fastened to the rod approximately midway between said eye and the bottom end of the hooks. Cooperating with this main grapple member is a second grapple member formed of an elongated rod with one hook formed integrally with the rod at one end of same and with an eye structure at the other end of same. This second eye structure is formed in a plane in alignment with the axis through the rod so that the hole formed by the eye has a central axis perpendicular to the rod axis. A limit disc is integrally fastened to this rod a short distance away from the eye portion. A fourth hook is integrally fastened to the second rod by welding or the like in a special manner and with a specially formed shape to complement a special shape provided at the midpoint of said second rod to provide a built-in camming curve combination of said second rod together with the fourth point member. The second rod member is mounted so that the specially configured cam portion thereof slides along the inner surface of the cam loop fastened to the main rod member. The limit disc near the eye end of the second rod also is associated with the right angle eye of the main rod member and outside thereof. A chain or flexible cable member connects the eye of the second rod member to the trap as used for catching desired animals.

3 Claims, 9 Drawing Figures

FOLDING GRAPPLE FOR TRAPS

BACKGROUND OF THE INVENTION

1. Field of the Invention

This invention relates generally to grapple devices for use with traps to catch animals and the like and specifically to a foldable four-prong grapple which is collapsible to compact size for storage and transporting and openable to full four-prong grapple position upon pull thereupon by an animal dragging the associated trap after springing and being caught by same.

2. Description of the Prior Art

A problem with known type grapple devices is that they often are provided with only two or three prongs and as a result thereof fail to provide as great a drag and catching area as is desired.

Another problem with known type grapples having four or more hook prongs is that they oftentimes are of a non-foldable or non-collapsible form and therefore are bulky and dangerous to store and transport.

Another problem with known type devices which are collapsible is that they are relatively complicated and have a number of component parts which can become lost, damaged or separated from the basic structure and thus render such structure useless or substantially inoperable.

Another problem with known type devices is that they are unduly complicated and difficult to operate, and thus require maintenance and repairs which are oftentimes not convenient for a trapper or user of the device.

Known prior art devices which may be pertinent to this invention are listed as follows:

U.S. Pat. Nos. 270,168 — Jan. 2, 1883
U.S. Pat. Nos. 1,305,175 — May 27, 1919
U.S. Pat. Nos. 2,521,537 — Aug. 5, 1950
U.S. Pat. Nos. 2,602,689 — July 8, 1952

None of these known devices offers the new and novel features of the invention disclosed herein.

SUMMARY OF THE INVENTION

An object of the present invention is to provide a folding grapple for use with animal traps and the like which may be conveniently stored and carried in a safe, compact manner, and also which may be safely concealed beneath the trap out of sight of the animal to be caught.

Another object of this invention is to provide a simple grapple structure of the minimum number of component parts which will be relatively maintenance free, and easy and simple to operate by a trapper or user thereof.

A further object of this invention is to provide a grapple device having four hooks or prongs associated therewith for maximum catching and contact area.

An additional further object of this invention is to provide a foldable grapple structure having four prongs therewith which may be collapsed into a relatively flat and compact package, and yet one which will automatically open to the full four-prong engaging position upon pull on the eye end of the grapple structure.

The invention disclosed herein has a mumber of new and unique features associated therewith. This invention consists of a four-prong folding type grapple which may be used with traps for trapping upland animals. The grapple is used to anchor a trap after it has been actuated by an animal and as it is being dragged away. The grapple is used because it is impossible in many of the northern areas of the country, and especially in places like Alaska, to use a stake or other means of firmly fastening the chain attached on the trap. When an animal actuates the trap, and is caught therein, it drags the trap and this grapple as connected thereto by chain means or the like. As the trap is being dragged, the grapple of this invention automatically opens to the full four-pronged maximum catching and engaging position, thereby offering maximum opportunity for it to be caught or impinged upon a tree, branch, rock protrusion, ice lump or any other projection or outcropping of the terrain.

This grapple structure having four prongs, two of which are always pointed in a downward direction, while the other two are always pointed upwardly and outwardly, substantially increases the number of hooks and contact area covered which may be caught upon some foreign object associated with the terrain. Normally, the use of a two-prong grapple will allow the trapped animal to drag the trap a considerable distance before it is caught on some object. The use of four hooks, of course, substantially increases the possibility of the grapple catching upon something and holding an animal so that it can be retrieved by the trapper. While grapples having three hooks may generally have two of the hooks dragging along the surface of the ground, the third hook is generally pointed upwardly directly between the two supporting hooks on the ground, and thus cannot normally catch on tree trunks, slight overhangs of rock strata, etc.

When trapping upland animals, it is generally advisable to have the grapple of such construction that it can be concealed. The grapple of this invention offers this desirable benefit since it can be folded into a relatively flat compact form and then may be concealed underneath the trap and out of sight of the animal until such time as the trap is sprung. This is an important advantage to the trapper. Generally when the trapper sets his traps, he digs a hole, places the folded grapple in the hole, and then conceals the trap on top of the grapple with leaves, grass, snow or the like lossely covering the grapple and/or the trap. Then when the animal actuates the trap and drags the chain connected between the trap and the grapple, the grapple will be actuated through its new and unique cam mechanism to the fully open four-prong position for maximum contact area for likely contact with some foreign object. This grapple is usable in areas where stakes cannot be drive in the ground, for example, if it is frozen solid, rocky ground, or some other place where a stake would not hold the trap.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
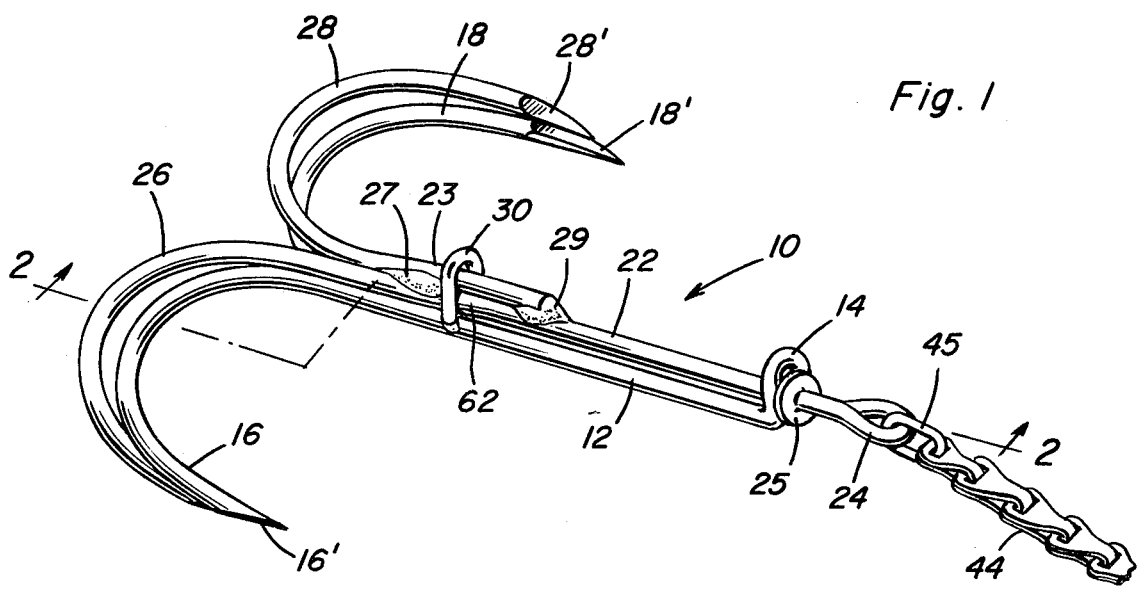
FIG. 1 is a perspective view of the grapple of this invention in the folded collapsed position.
Figure 2:
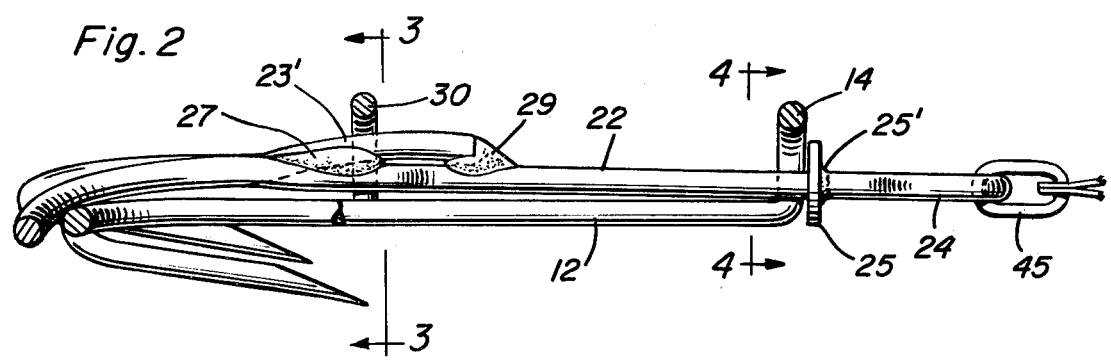
FIG. 2 is a side elevational view, partly in cross-section, taken generally along line 2—2 of FIG. 1.
Figure 3:
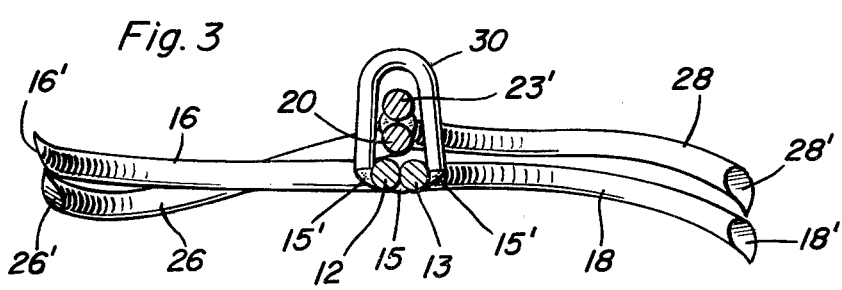
FIG. 3 is a view partly in cross-section taken generally along line 3—3 of FIG. 2.
Figure 4:
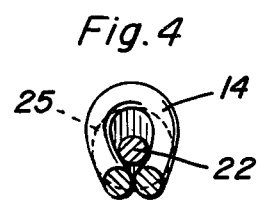
FIG. 4 is a view partly in cross-section taken generally along line 4—4 of FIG. 2.
Figure 5:
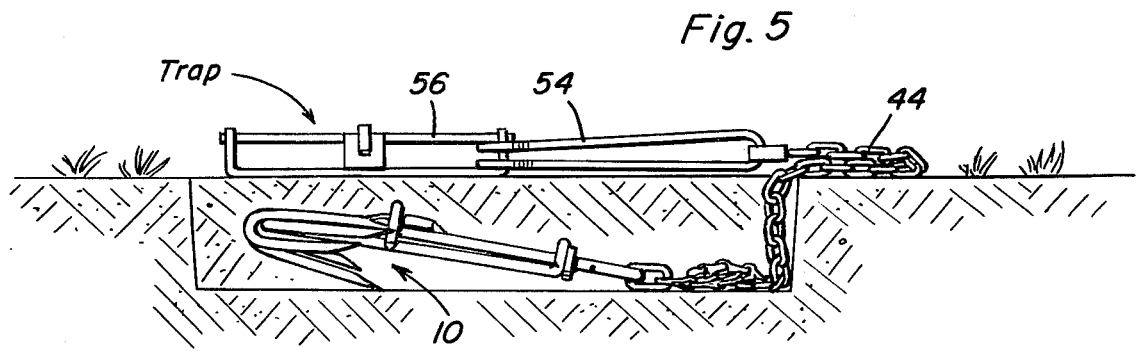
FIG. 5 is a view in side elevation of this invention as in use with a spring trap for catching wildlife.
Figure 9:
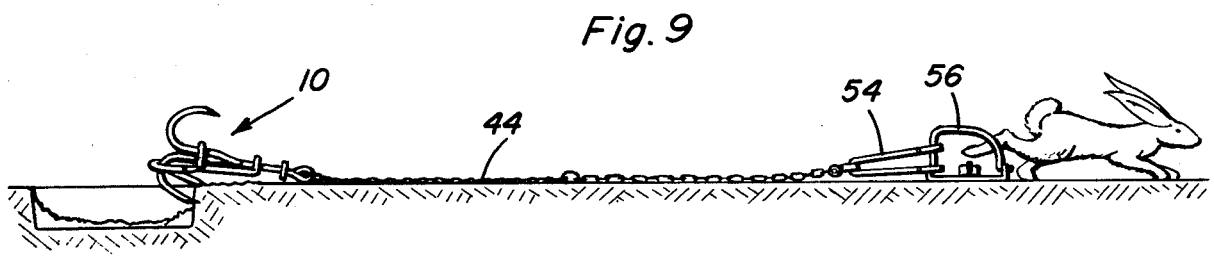
FIG. 9 is an elevational view similar to that of FIG. 5 after the trap has been actuated and the grapple has been opened to the full open prong position.

Referring to FIGS. 1, 5, and 9, reference numeral 10 indicates in general the folding grapple structure of this invention. Looking at FIGS. 1-4, the basic component units of the grapple structure will be described in detail. A primary or main grapple rod member 12 is provided with an eye 14 at one end thereof. This eye 14 is substantially at right angles to the longitudinal axis of the body rod 12 and with the axis at the center of the hole through said eye being parallel to said rod. The other end of the main body rod member 12 is bent in the shape of a prong or hook 16. This hook is appropriately sharpened at the end thereof 16'. Attached to the rod 12 diametrically opposite to hook 16 is another hook 18 provided with a sharpened tip 18'. This hook 18 is appropriately welded to the rod body 12 so as to be integral therewith. This welding is best seen in the view of FIG. 3 and is indicated by reference numeral 15. Also attached along this welded area to the portion 13 of hook 18 and the associated opposite portion 12 of the main rod member is a cam loop 30. This cam loop 30 is also welded as indicated by 15' so as to be integral with the main support rod member 12. This cam loop 30 associates and functions with the complementary cam structure of the secondary portion of the grapple as described below.

The secondary portion of the grapple structure consists of a longitudinally slidable rod member 22 having an eye 24 provided at one end thereof with the hole of said eye having a central axis perpendicular to the longitudinal axis of rod member 22. A limit disc or washer 25 is welded to rod member 22 a short distance inwardly from eye 24. The other end of rod member 22 is provided with a hook 26 having an appropriate sharpened pointed end 26'. The rod member 22 is provided with a slightly offset portion 62 close to the junction of said rod with hook 26. This bent portion 62 functions as part of the cam mechanism. Welded integrally thereto along this deformed or bent area is the bent shank portion 23 of a fourth hook 28. This fourth hook 28 also is provided with a sharpened pointed end 28'. The bent portion 23 of hook 28 which is attached by welding 27 and 29 to the secondary rod member 22 near the bent portion 62 has the respective welds 27, 29 formed and shaped to provide a smooth slidable surface thereon.

Normally in the construction of the overall grapple structure, the main primary rod structure 12 will be appropriately formed and welded to hook 18. Then the rod member 22 will have the hook end 26 and the bent portion 62 formed therein prior to the welding of prong 28 thereto. Then this secondary longitudially slidable rod member 22 will be mounted through the loop 30 and the eye 14 of the primary member. After so interengaging the two structures, the limit disc 25 will be slid onto the straight end of rod member 22 and appropriately welded thereto, and then the eye 24 will be appropriately made in the outer end of rod member 22. Once constructed in assembled relationship, the overall grapple has only one basic movable part, i.e., the longitudinally movable secondary rod member 22 with the associated cam surfaces provided by 62, 23 and 27 as mating with the inner side of cam loop 30 on the primary rod structure 12. A chain 44 or other flexible connecting cable may be connected by link 45 to the eye 24 at one end thereof and at the other end connected to an appropriate animal trap.

As shown in FIG. 5 the chain 44 is attached to the spring mechanism 54 for the trap jaws 56. This Figure also shows the grapple as in the folded collapsed position concealed by light debris or other nonpacked material and with the spring trap placed thereover. As thus installed, the grapple structure will be out of sight of any animals. Normally also the trap itself will be lightly covered so as not to be clearly visible to the animals desired to be caught.

Figure 6:
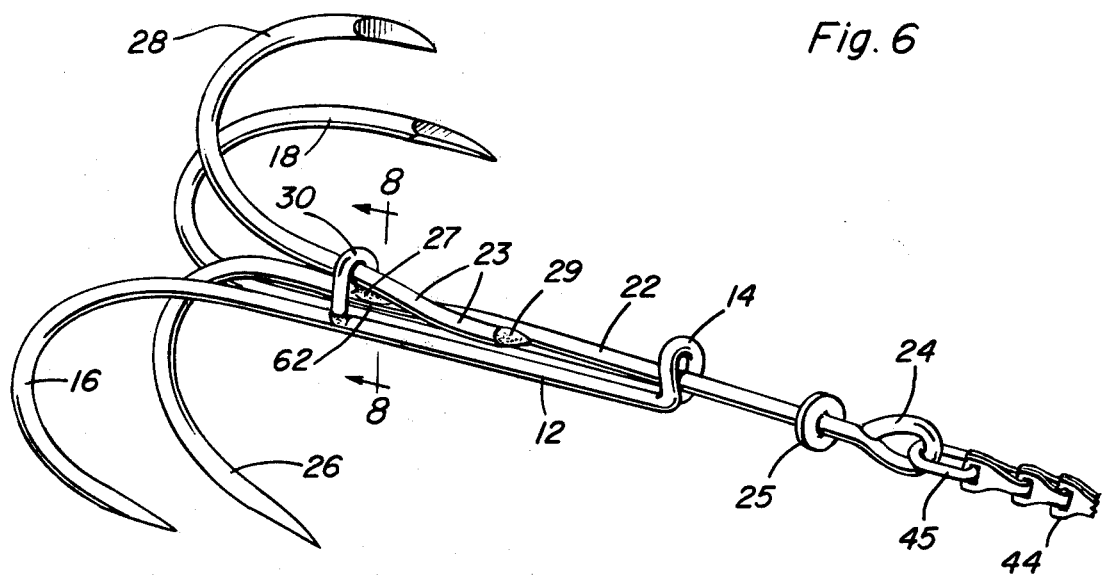
FIG. 6 is a perspective view with the grapple in the full open position.
Figure 7:
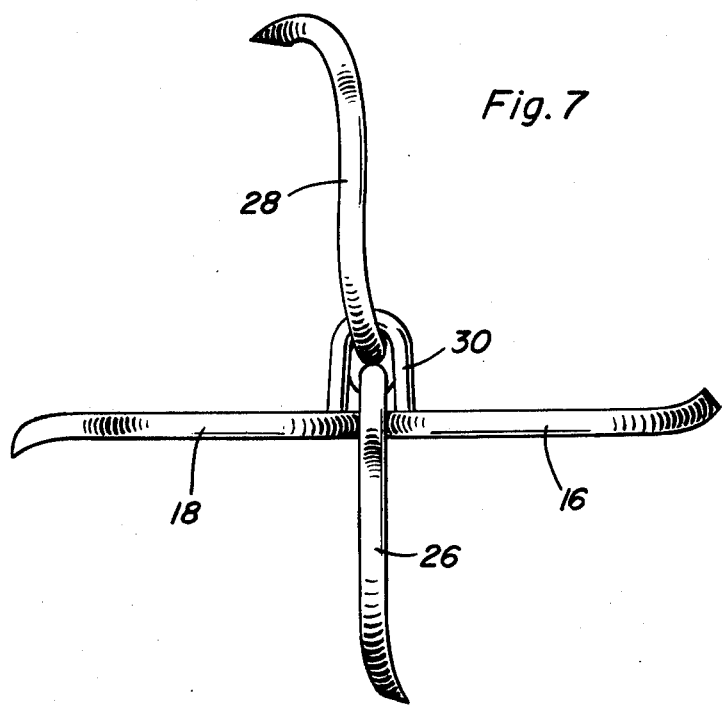
FIG. 7 is an end view from the bottom of the hook end of FIG. 6.
Figure 8:
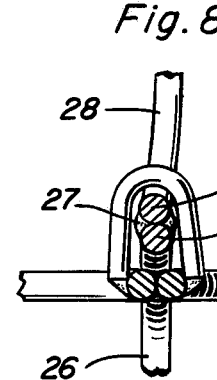
FIG. 8 is a view partly in cross-section taken generally along line 8—8 of FIG. 6.

FIGS. 6-9 show the four-prong grapple structure of this invention as opened with the four prongs fully extended after actuation thereof by a pull on the chain 44 by a trapped animal. In the example shown in FIG. 9, a rabbit has sprung the trap jaws 56 and has been caught thereby. As the animal pulls the trap and associated chain 44, suitable pressure will be exerted on the eye 24 to move the secondary rod member 22 longitudinally relative to main rod member 12. This longitudinal movement thus causes the bent portion 23 of hook 28, the bent portion 62 of the secondary rod member 22, and the interconnecting welding 27 to cam the prongs 26 and 28 to the position at right angles to prongs 16 and 18 as best seen in FIGS. 6 and 7. This camming action occurs through association with the cam loop 30 described above. This same camming action will take place when the trapper desires to collapse the trap, and occurs when the eye end 24 of secondary rod member 22 is pushed inwardly relative to the primary rod member 12 and the associated eye 14. Again, the specially configured shape of portion 23, 62 and welding 27 against the inner surface of cam loop 30 will force the prongs 26 and 28 towards the other prongs 16, 18 and effect the folding and closing of the grapple structure.

As seen in FIG. 9 at least one of the grapple prongs has caught in the side of the hole and will prevent the rabbit from going any further. If the rabbit should succeed in disengaging the grapple from the engaged position thereof with the trap hole, as he continues into the underbrush or along the surface terrain, other protruding foreign objects will tend to be engaged with one or more of the grapple hooks to hang the grapple up and prevent further progress of the rabbit or other trapped animal.

The four-prong folding grapple structure of this invention offers many desirable advantages to a trapper and user thereof. It can be easily and readily folded into compact storable form, and then is automatically opened to full four-prong obstruction catching position upon a slight pull upon the outer end of the secondary rod member. It may just as easily be reset to the once again foldable position by releasing the caught animal and moving the longitudinal member 22 inwardly relative to the primary member. The overall structure basically has only one movable part; there is nothing in the way of extra components of a loose nature which can be lost or damaged, so the relative maintenance and operation of the structure is extremely simple.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A folding grapple comprising, first and second anchor members each having an elongate shank and a pair of outwardly and oppositely extending hooks rigidly affixed on one end thereof, one of said anchor members having a pair of upstanding aligned eyes spaced along the length thereof, the shank of the other anchor member engaging through said eyes for lengthwise longitudinal sliding movement, 90° cam surface means extending along part of the length of the other anchor member shank and engaging through one of said eyes, the last-mentioned eye constituting a cam follower slidably engaging said cam surface means, whereby upon lengthwise relately movement of the other anchor member shank through said eyes, said other anchor member is rotated 90° between one condition in which the hooks on both anchor members are disposed in parallel planes and another condition in which the hooks lie in planes at right angles to one another.

2. A folding grapple as claimed in claim 1, one of said eyes being at the end of said one anchor member shank remote from the hooks thereon and the other of said eyes being adjacent to hooks on said one anchor member shank.

3. A folding grapple as claimed in claim 2, the 90° cam surface means on said other anchor member shank being adjacent the end thereof having the hooks, and the eye on said one anchor member shank which engages the cam surface means on the other anchor shank being adjacent the end of said one anchor member shank with the hooks thereon.

* * * * *